United States Patent [19]

Ito et al.

[11] Patent Number: 5,059,444
[45] Date of Patent: Oct. 22, 1991

[54] METHOD OF PRODUCING MEAT PRODUCTS

[75] Inventors: Kyoji Ito, Ashiya; Shingo Iwamoto, Amagasaki, both of Japan

[73] Assignee: Ito Ham Kabushiki Kaisha, Kobe, Japan

[21] Appl. No.: 532,173

[22] Filed: Jun. 4, 1990

Related U.S. Application Data

[63] Continuation-in-part of Ser. No. 358,625, May 25, 1989, abandoned.

[30] Foreign Application Priority Data

Jun. 2, 1988 [JP] Japan .................. 63-136487

[51] Int. Cl.$^5$ ............................................ A23L 1/275
[52] U.S. Cl. .................................... 426/540; 426/250; 426/264; 426/265; 426/281
[58] Field of Search ............... 426/281, 590, 264, 265, 426/641, 250

[56] References Cited

U.S. PATENT DOCUMENTS

| 3,748,147 | 7/1973 | Hale et al. ............................ 426/250 |
| 3,961,090 | 6/1976 | Weiner et al. ...................... 426/281 |
| 4,474,475 | 10/1984 | Fishman ............................. 426/281 |
| 4,721,623 | 1/1988 | Coffey et al. ....................... 426/641 |

Primary Examiner—Donald E. Czaja
Assistant Examiner—D. Workman
Attorney, Agent, or Firm—Marshall, O'Toole, Gerstein, Murray & Bicknell

[57] ABSTRACT

A method of producing meat products wherein a red color pigment is dispersed throughout a block of meat, the pigment having a discoloration temperature which is higher than the sterilization temperature of the meat, and the block of meat is heated under conditions such that the central internal portion of the block reaches sterilization temperature but not the discoloration temperature, with the remaining external portion of the block exceeding both the discoloration and sterilization temperatures.

5 Claims, 2 Drawing Sheets

METHOD OF PRODUCING MEAT PRODUCTS

CROSS-REFERENCE TO RELATED APPLICATION

This is a continuation-in-part of copending, commonly assigned application Ser. No. 07/358,625, filed May 25, 1989, now abandoned.

BACKGROUND OF THE INVENTION

1. Field Of The Invention

The invention relates to a method of producing meat products.

2. Description Of Related Technology

Generally speaking, roast meat (in particular, roast beef) is prepared by heating a block of meat, such as in an oven, at about 180° to 200° C., for about 20 minutes until the temperature of the central internal portion thereof reaches about 40° to 50° C. In this way, the blood pigment of the external portion of the block of meat is denatured to lose its red color, and the central portion of the block is kept below the discoloration temperature of meat (normally about 55° C.), retaining the original red color or in the so-called half-roasted state.

Such roast meat is normally cooked and eaten at home, or served to customers shortly after cooking in restaurants, and it is prohibited by law to serve roast meat as meat products other than prepared according stated time and temperature combinations.

In the United States, regulations of the U.S. Department of Agriculture define minimum temperatures which shall be produced and maintained in all parts of each piece of meat for at least a stated time associated with such temperatures, for cooked beef, roast beef, and cooked corned beef meat products. The time/temperature combinations for such products are stated in 9 C.F.R. §318.17(a), as reproduced below in Table I:

TABLE I

TIME/TEMPERATURE COMBINATION FOR COOKED BEEF, ROAST BEEF, AND COOKED CORNED BEEF

| Minimum internal temperature | | Minimum processing time in minutes after minimum temperature is reached |
|---|---|---|
| Degrees Fahrenheit | Degrees Centigrade | |
| 130 | 54.4 | 121 |
| 131 | 55.0 | 97 |
| 132 | 55.6 | 77 |
| 133 | 56.1 | 62 |
| 134 | 56.7 | 47 |
| 135 | 57.2 | 37 |
| 136 | 57.8 | 32 |
| 137 | 58.4 | 24 |
| 138 | 58.9 | 19 |
| 139 | 59.5 | 15 |
| 140 | 60.0 | 12 |
| 141 | 60.6 | 10 |
| 142 | 61.1 | 8 |
| 143 | 61.7 | 6 |
| 144 | 62.2 | 5 |
| 145 | 62.8 | Instantly |

Conventional roast meat may not be sold as a meat product other than as provided above, because in meat which is half-roasted (half-done) at the central portion, if bacteria such as salmonella which cause food poisoning are present and have not been killed, they may grow again during storage.

To produce and sell roast meat as meat products, it is compulsory to subject meat to heat sterilization, by heating the block of meat at time and temperature conditions as stated above, or at equivalent sterilization conditions.

However, in the case of roast meat products cooked by heating as designated above, the block of meat is heated at its center above the discoloration temperature of meat, and the central portion is discolored to yellowish brown. It is, therefore, difficult to maintain the state of yellowish brown on the outer portion and red in the central portion that is unique to roasted meat, and to provide the taste, texture and flavor of conventional roast meat in roasted meat products.

SUMMARY OF THE INVENTION

It is an object of the invention to overcome one or more of the problems described above.

According to the present invention, a method of producing roast meat products is characterized in that a red color pigment is added to and dispersed throughout a block of raw meat, the pigment having a discoloration temperature higher than the sterilization temperature of the meat product for a given heating time and the pigment losing its red color upon heating to the discoloration temperature or higher, followed by heating the block of meat to sterilize the central internal portion thereof by heating under the time and temperature sterilization conditions whereby the central portion reaches a temperature below the discoloration temperature of the pigment so as to discolor the red color in the external portion of the block, but not in the central internal portion.

Other objects and advantages of the invention will be apparent to those skilled in the art from review of the following detailed description, taken in conjunction with the drawings and the appended claims.

DETAILED DESCRIPTION OF A PREFERRED EMBODIMENT

Figure 1:
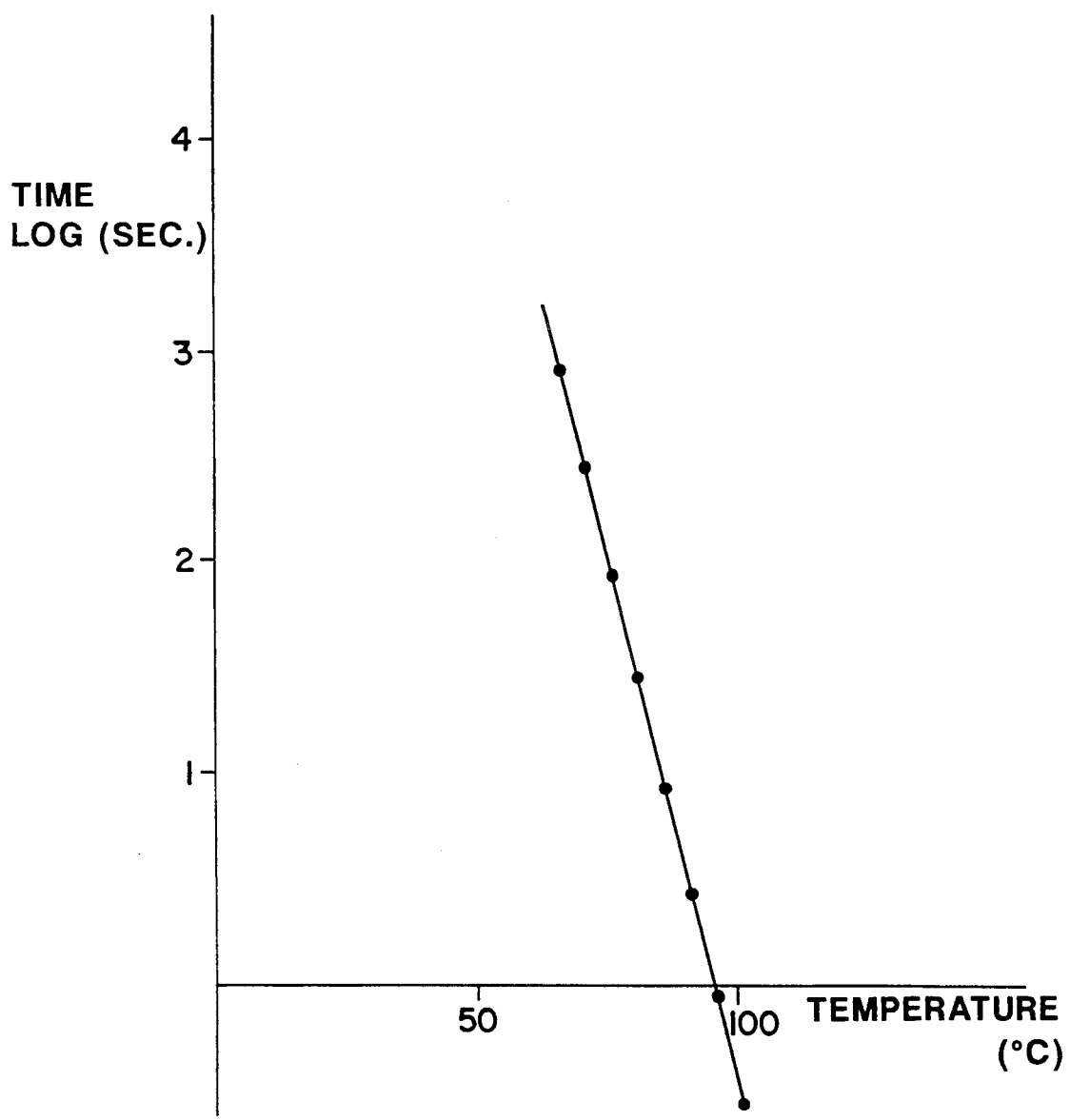
FIGS. 1 and 2 are temperature vs. time graphs showing exemplary sterilization conditions for roast meat products.

As the raw material for the present invention, raw meat such as beef, pork or poultry is preferred, but other animal meat may be used. A block of meat of any size is useful, other than a very thin slice of meat which will be discolored instantly throughout upon cooking by heating and cannot be subjected to proper heat treatment.

The red color is a synthetic or natural red pigment or a combination of such pigments. Any of such pigments may be used as long as its discoloration temperature is higher than a sterilization temperature of the meat product to which the meat is to be subjected and the red color is lost when the pigment is heated to a higher temperature.

The red color pigment may be a substance obtained from red beets in a conventional manner. This substance may be betanin, which is a naturally occurring pigment in red beets (Beta vulgaris) that is well-known to those in the relevant art and used as a food coloring. Alternatively, a substance referred to as "beet red" may be used. This substance contains betanin as well as naturally occurring beet juices and is well known to those in the relevant art.

The manner of obtaining betanin and/or beet red from red beets is conventional and well-known. For example, a description of such a method is described by von Elbe, et al. in an article entitled "Color Stability of Betanin," *Journal of Food Science*, Vol. 39, pp. 334–337 (1974), the disclosure of which is incorporated herein by reference. A detailed method of obtaining betanin and beet juice from red beets is described by von Elbe, et al. in another article entitled "Quantitative Analysis of Betacyanins in Red Table Beets (Beta Vulgaris)," *Journal of Food Science*, Vol. 37, pp. 932–934 (1972), the disclosure of which is incorporated herein by reference.

A suitable red color pigment for use in the invention is commercially available from Sanei Kagaku Co., Ltd. under the trademark "Sun Beet LF." This pigment is available from Sanei Kagaku in two forms, a liquid form referred to by Sanei Kagaku as "Sun Beet LF" and a powdered form referred to as "Powdered Sun Beet LF." The only substantial difference between these two forms of the pigment is the physical state, the first form being a liquid and the latter being a powder. The main pigment component of both forms of "Sun Beet LF" is betanin.

Sun Beet LF pigment is not discolored under sterilization conditions of 63° C./30 minutes.

The pigment is preferably mixed with appropriate seasonings such as phosphate or common salt. The mixture is then added to a block of raw meat, and the block is subjected to tumbling by a tumbler for an appropriate time until the mixture is evenly dispersed therein.

The block of meat is then heated in an oven by a known method so as to lose the red color of the external portion thereof.

Next, the oven temperature is adjusted and the block of meat inside the oven is heated until the temperature of the central internal portion reaches the discoloration temperature of the meat, and the temperature is maintained for an appropriate time (preferably about 60 minutes).

The oven temperature is adjusted again, and the central portion of the block of meat is subjected to heat sterilization by heating it under the time/temperature sterilization conditions at a temperature below the discoloration temperature of the pigment, so as to lose the red color of the external portion of the block only. To be more specific, as for the above-identified sterilization conditions, the block of meat may be heated for 32 minutes with its central portion temperature being 136° F. (57.8° C.) and below the discoloration temperature of the pigment. When taken out of the oven after heat sterilization, the block of meat is a roast meat product suitable for storage.

The oven temperatures in the above-mentioned various stages depend on the number, size and shape of block of meat to be put into the oven, and the temperature at the central internal portion of the block of meat is used as the standard.

A meat product thus obtained has an external portion which has lost the red color and a central internal portion retaining the red color since the central internal portion was maintained below the discoloration temperature of the pigment; the meat product thus has an appearance of ordinary roast meat.

Figure 2:
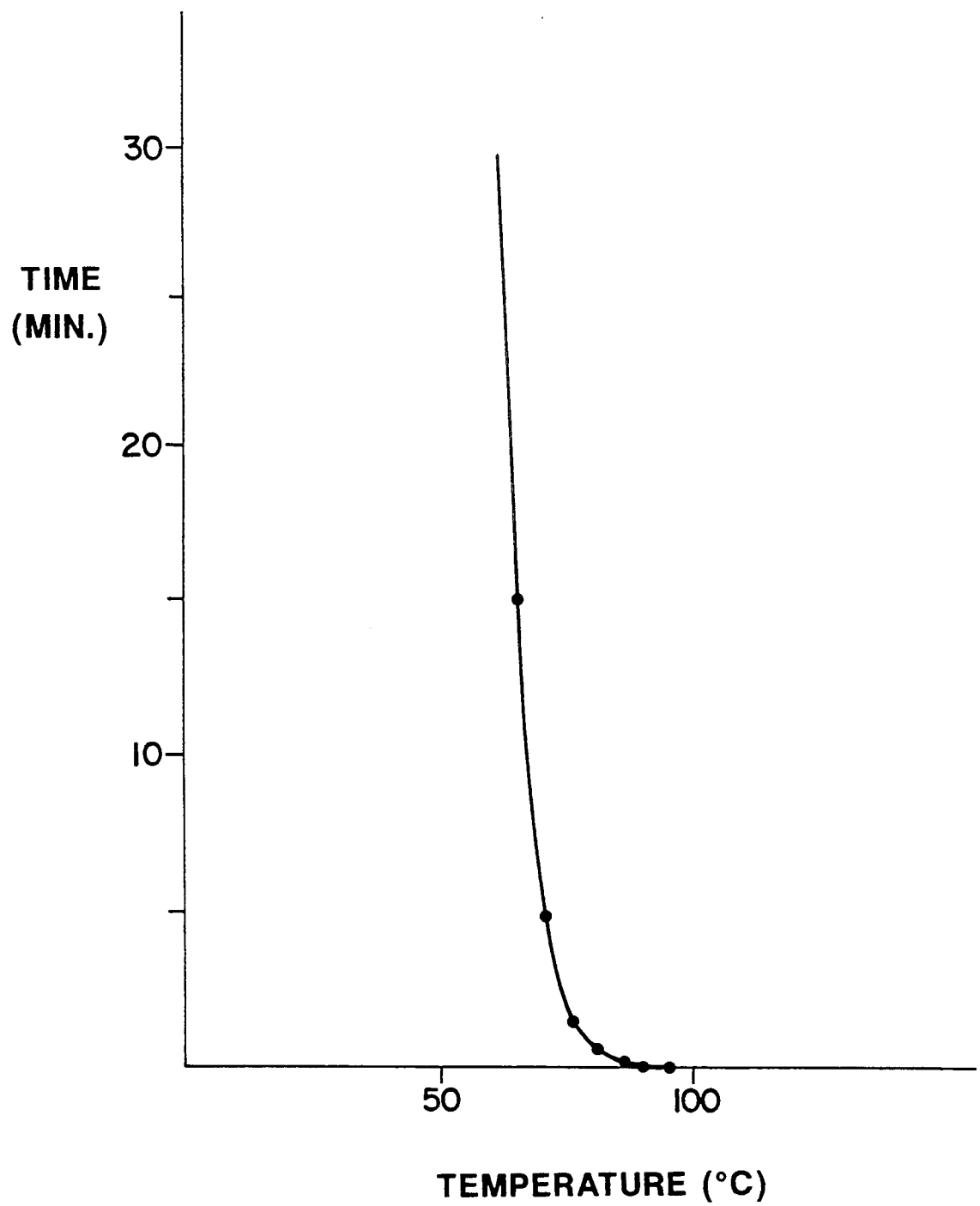

The above-mentioned method or one of equivalent or superior effect may be selected from the temperature vs. time relationships shown in FIGS. 1 and 2. FIG. 1 shows the time and temperature sterilization conditions when the food is to be kept at 10° C. FIG. 2 plots for food in general the sterilization conditions under which tubercle bacillus (Mycobacterium tuberculosis) is killed (see Table II below) as examples of methods equivalent to heating at 136° F. for 32 minutes.

TABLE II

| Sterilization Conditions | |
|---|---|
| Heating temperature (°C.) | Heating time |
| 65 | 19 minutes |
| 70 | 6 minutes |
| 75 | 1.9 minutes |
| 80 | 36 seconds |
| 90 | 3.6 seconds |
| 95 | 1.1 seconds |
| 100 | 0.36 second |

EXAMPLE 1

First, 7 grams of beet red ("Sun Beet LF", Sanei Kagaku Co., Ltd.) is put in a one-liter vessel. 0.5 liter of water is then added with stirring. A seasoning preparation of the following composition is added to and mixed in the solution.

| Composition of seasoning preparation | |
|---|---|
| Monosodium glutamate | 1.5 g |
| Sodium inosinate | 0.075 g |
| Common salt | 20 g |
| Phosphate | 5 g |

200 milliliters (ml) of the resulting liquid is injected into 1 kg of a block of raw beef (topside). Then, the liquid is evenly dispersed in the block of beef by tumbling the block of beef in a tumbler.

Next, to roast the surface of the block of beef and prevent meat juice from running out of the block, the block of beef is heated at 200° C. in an oven for 20 minutes.

The oven temperature is subsequently adjusted to 120° C. and the block of meat is kept for one hour in such a way that the central portion thereof is kept at 50° C.

After that, the oven temperature is adjusted to 70° C., and the block of meat is kept in the oven for 30 minutes after the temperature of the central portion thereof reaches 63° C. Then the block of meat is taken out of the oven as a roast meat product.

EXAMPLE 2

First, 7 g of beet red ("Sun Beet LF", Sanei Kagaku Co., Ltd.) is put in a one-liter vessel, and 0.5 liter of water is added to it with stirring. A seasoning preparation of the following composition is added to and mixed with the solution.

| Composition of seasoning preparation | |
|---|---|
| Monosodium glutamate | 1.5 g |
| Sodium inosinate | 0.075 g |
| Common Salt | 22 g |
| Spices | 1 g |
| Phosphate | 5 g |

80 ml of the resulting liquid is injected into 400 g of a block of raw mutton (roast). Then, the liquid is evenly dispersed in the block of raw meat by tumbling the block in a tumbler.

Next, to roast the surface of the block of raw meat and prevent meat juice from running out of the block, the block of meat is heated at 200° C. in an oven for 20 minutes.

The oven temperature is subsequently adjusted to 120° C. and the block of meat is kept for 20 to 30 minutes in such a way that the central portion thereof is kept at 50° C.

After that, the oven temperature is adjusted to 70° C., and the block of meat is kept in the oven for 30 minutes after the temperature of the central portion thereof reaches 63° C. Then the block of meat is taken out of the oven as a roast meat product. In the two examples above, "Sun Beet LF" was used in its powdered form; however, it could also be used in its liquid form.

Meat products prepared according to the present invention were then subjected to a sensory test with panelists and bacteria tests as follows.

Sensory test

A sensory test was made on the following meat products with ten panelists, in terms of the appearance, color of the sliced surface, taste and texture, and flavor of roast beef according to the five-grade system shown with the results in Table III.

(1) conventional roast beef with no addition, which was cooked by heating until the temperature of the central portion thereof reached 43° C.;

(2) roast beef with no addition, which was prepared by heating at 200° C. for 20 minutes, then heating at 120° C. until the temperature of the central portion reached 50° C., and subsequently heating at 70° C. and then maintaining for 30 minutes after the central temperature reached 63° C.;

(3) roast beef with no addition, which was prepared by heating at 200° C., and then maintaining for 30 minutes after the central temperature reached 63° C.;

(4) roast beef according to the invention (prepared by the same cooking by heating with (2) above); and (5) roast beef according to the invention (prepared by the same cooking by heating with (3) above).

TABLE III

| Product Compared | Appearance | Sliced Surface Color | Taste & Texture | Flavor |
| --- | --- | --- | --- | --- |
| (1) | 0 | 0 | 0 | 0 |
| (2) | 0 | −2 | −1.1 | −0.4 |
| (3) | −0.5 | −2 | −2 | −2 |
| (4) | +0.6 | +1.5 | +1.2 | +1.7 |
| (5) | 0 | +1.1 | 0 | +0.6 |

Remarks:
+2 Fairly better than ordinary products.
+1 Rather better than ordinary products.
0 Comparable to ordinary products.
−1 Rather inferior to ordinary products.
−2 Fairly inferior to ordinary products.

Bacteria Test

Five kinds of roast beef (1) through (5) identical to those used in the foregoing sensory test were subjected to a storage test. The results are shown in Table IV.

The method for judging coliform bacilli was as follows. Samples were aspectically taken from the central portions of the respective products. The samples were used for inoculating Brilliant Green Lactose Broth (BGLB) and inoculated media were incubated. Samples which produced gas were than used for inoculating media were incubated. EMB-medium-positive samples were used for inoculating Luctose Brats (LB) media, and the inoculated media were incubated. Those which produced gas were used for inoculating standard agar media, and the inoculated media were incubated. After incubation, colonies were stained by Gram's method and examined microscopically. Those recognized as gram-negative, asporogenic bacillus were judged to be coliform-bacilli-positive.

As for the storage test for salmonella, the material meat of each product was inoculated with $1 \times 10^6$ of salmonella per gram of the material meat. The inoculated meat specimens were subjected to one of heat treatments (1) through (5), respectively, and then put to the storage test at keeping temperature of 10° C. The central portions of the products were aseptically sampled, and the samples were used for inoculating Enterobacteriaceae Enrichment Mannitol (EEM) broth, and bacteria were allowed to grow. After that, the media were used for inoculating Hajna-Tetrathionate Broth, and the cultures were incubated. Positive cultures were used for inoculating Triple Sugar Iron (TSI) agar, Sulfide Indole Motility (SIM) medium, and Lysine Decarbonation test medium, and cultures were incubated. Those judged to be positive for the three media were mixed with O polyvalent antiserum. Those which showed flocculation were judged to be salmonella-positive.

TABLE IV

| Product | Number of days | | | | | | |
| --- | --- | --- | --- | --- | --- | --- | --- |
| | 0 | 5 | 10 | 20 | 30 | 40 | 50 |
| | General viable count (/g) | | | | | | |
| (1) | $1.2 \times 10^3$ | $3.9 \times 10^6$ | $8.2 \times 10^7$ | $<10^7$ | $<10^7$ | $<10^7$ | $<10^7$ |
| (2) | <300 | <300 | <300 | <300 | <300 | <300 | <300 |
| (3) | <300 | <300 | <300 | <300 | <300 | <300 | <300 |
| (4) | <300 | <300 | <300 | <300 | <300 | <300 | <300 |
| (5) | <300 | <300 | <300 | <300 | <300 | <300 | <300 |
| | Coliform bacilli | | | | | | |
| (1) | + | + | + | + | + | + | + |
| (2) | − | − | − | − | − | − | − |
| (3) | − | − | − | − | − | − | − |
| (4) | − | − | − | − | − | − | − |
| (5) | − | − | − | − | − | − | − |
| | Salmonella | | | | | | |
| (1) | + | + | + | + | + | + | + |
| (2) | − | − | − | − | − | − | − |

TABLE IV-continued

| Product | Number of days | | | | | | |
|---|---|---|---|---|---|---|---|
| | 0 | 5 | 10 | 20 | 30 | 40 | 50 |
| (3) | − | − | − | − | − | − | − |
| (4) | − | − | − | − | − | − | − |
| (5) | − | − | − | − | − | − | − |

Remarks:
+ Positive.
− Negative.

As shown above, meat products obtained by the method of the invention do not differ at all from ordinary roast beef in appearance, and do not differ from or are more superior to ordinary roast beef in color tone of the sliced surface, taste and texture, and flavor, and furthermore, the meat products are much superior to the products with no addition which were subjected to heat treatment according to the invention in terms of appearance, color tone, taste and texture, and flavor.

The meat products obtained by the method of the invention gave, as shown in Table IV above, after 50 days of storage, very low viable counts of general bacteria in comparison with ordinary roast beef products, and did not show any growth of coliform bacilli or salmonella, and are, therefore, meat products of very improved storage capability.

The foregoing detailed description is given for clearness of understanding only, and no unnecessary limitations should be understood therefrom as modifications within the scope of the invention will be apparent to those skilled in the art.

What is claimed is:

1. A method of producing a meat product comprising the steps of:
   (a) dispersing red color pigment throughout a block of meat, said red color pigment losing its red color upon heating to a discoloration temperature higher than a sterilization temperature of said block of meat, and
   (b) heating said block of meat under conditions such that a central internal portion thereof is heated to said sterilization temperature but below said discoloration temperature for a period of time sufficient to effect sterilization of the entire block of meat and the remaining external portion of said block of meat is heated to a temperature above said discoloration temperature, whereby said red color is discolored in said external portion but not in said central internal portion of said block of meat.

2. The method of claim 1 wherein said pigment comprises natural red color pigment.

3. A method of producing a meat product comprising the steps of:
   (a) dispersing a natural red color pigment throughout a block of meat, said red color pigment losing its red color upon heating to a discoloration temperature higher than a sterilization temperature of said block of meat; and
   (b) heating said block of meat under conditions such that a central internal portion thereof is heated to said sterilization temperature but below said discoloration temperature for a period of time to effect sterilization of the entire block of meat and the remaining external portion of said block of meat is heated to a temperature above said discoloration temperature whereby said red color is discolored in said external portion but not in said central internal portion of said block of meat.

4. A method of producing a meat product comprising the steps of:
   (a) dispersing a red color pigment comprising betanin throughout a block of meat, said red color pigment losing its red color upon heating to a discoloration temperature; and
   (b) heating said block of meat under conditions such that a central internal portion thereof is heated to a temperature below said discoloration temperature and the remaining external portion of said block of meat is heated to a temperature above said discoloration temperature whereby said red color is discolored in said external portion but not in said central internal portion of said block of meat.

5. A method of producing a meat product comprising the steps of:
   (a) dispersing a red color pigment comprising red beet pigment throughout a block of meat, said red color pigment losing its red color upon heating to a discoloration temperature; and
   (b) heating said block of meat under conditions such that a central internal portion thereof is heated to a temperature below said discoloration temperature and the remaining external portion of said block of meat is heated to a temperature above said discoloration temperature whereby said red color is discolored in said external portion but not in said central internal portion of said block of meat.

* * * * *